Patented Feb. 19, 1952

2,586,571

UNITED STATES PATENT OFFICE 2,586,571

STYRENE COPOLYMERS

John Joseph Sleightholme, Carlisle, England, assignor, by mesne assignments, to The Sherwin-Williams Company, Cleveland, Ohio, a corporation of Ohio No Drawing. Application February 16, 1949, Serial No. 76,857. In Great Britain February 17, 1948

15 Claims. (Cl. 260—23)

This invention is for improvements in or relating to styrene copolymers and has for an object to provide a new class of such copolymers which are resinous materials suitable for use as surface coatings or for impregnation purposes.

The invention has for an object to provide copolymers of styrene and related compounds with the unsaturated aromatic residues contained in the extract resulting from the treatment of mineral lubricating oils with selective solvents, such as, liquid $SO_2$ by the Edeleanu process, referred to in "Modern Petroleum Technology" published by the Institute of Petroleum, in London, in 1946. The aromatic petroleum residues are soluble in white spirit and solvent naphtha and are believed to consist of mixtures of complex cyclic unsaturated hydrocarbons, as described in "Industrial Chemistry," by E. R. Riegel, 3rd Ed., 1937, Reinhold Publishing Corporation, page 403. Examples of such materials, hereinafter referred to as "aromatic petroleum residues," are the materials sold under the trade names Iranolin, Dutrex and Petromor.

According to the present invention there is provided a process for the production of a styrene copolymer which comprises heating styrene, or a nuclear alkyl or halogen substitution product thereof, with an aromatic petroleum residue as hereinbefore defined; the process is preferably carried out by heating the reaction mixture under reflux.

Depending upon the ratio of the styrene or styrene substitution product to the aromatic petroleum residue, the physical characteristics of the copolymers vary from brittle resins to soft balsams.

I have found that it is advantageous to carry out the reaction under pressure, particularly as pressures in excess of 1 atmosphere superatmospheric pressure result in a very marked reduction in the reaction time required to effect a substantially complete copolymerisation.

The reaction may be carried out in solution, for example, in an aromatic solvent such as xylene, to produce a reaction product from which surface-coating films are deposited by solvent removal; such solutions may also be advantageously employed in the impregnation of porous surfaces.

I have further found that we can control the molecular complexity of the copolymer by carrying out the reaction in the presence of a monocyclic alpha-terpene or, alternatively, by carrying out the reaction in the presence of small amounts of sulphur, for example, amounts of the order of 1–2% by weight.

Moreover, the styrene compound or the monocyclic alpha-terpene can be added, if desired, during the course of the reaction either continuously or portion-wise, for example, starting with a portion only of the required amount of styrene or terpene in the initial reaction mixture and adding the remainder of the required quantity during the course of the copolymerisation reaction.

The nature of the product varies, as above indicated, depending upon the ratio of the styrene compound to the aromatic petroleum residue and I find that the use of equal weights of styrene and the aromatic petroleum residue give rise to a clear, brittle resin, whilst if the amount of styrene is only half that of the amount of the aromatic petroleum residue, then a balsam is produced.

A feature of the invention consists in that the styrene or the substitution product thereof and the aromatic petroleum residue are copolymerised in the presence of an unsaturated acidic resinous material, for example rosin. This copolymer is a particularly interesting product since, by reason of the presence in the copolymer molecule of the acidic resinous material, it is capable of being emulsified or dispersed in an aqueous medium in the presence of an alkali.

The following examples illustrate the manner in which the invention may be carried into effect:

Example 1

A reaction mixture was prepared by mixing together equal weights of monomeric styrene and the aromatic petroleum residues and heating the mixture under reflux during a period of 4 hours at the end of which time the temperature of the reaction mixture had risen to 200° C. The reaction product was a dark but clear and brittle resin which had a melting point of 74° C.

When the reaction product was treated with petroleum ether (boiling range 60° to 80° C.) it was found that 12½% by weight of the product went into solution thus indicating that the aromatic petroleum residues had entered into a copolymeric molecule with the styrene since the aromatic petroleum residues themselves are completely soluble in that petroleum ether.

Example 2

A reaction mixture was prepared by mixing 100 grams of the aromatic petroleum residues and 20 grams of monomeric styrene and the mixture was refluxed for 2½ hours at the end of which time a further 20 grams of monomeric styrene were added.

The refluxing of the reaction mixture was continued for a further 8½ hours at the end of which time the product was a soft balsam which was found to be incompatible with linseed oil.

A further 20 gram of monomeric styrene were then added to the reaction mixture which was refluxed for a further six hours.

The final product thus obtained was a low melting, brittle resin containing 95% by weight of non-volatile matter and was insoluble in various drying oils as well as in white spirit.

Example 3

40 grams of the aromatic petroleum residues and 80 grams of monomeric styrene were dissolved in 90 grams of xylene. The reaction mixture was refluxed for 18 hours and the final product had a solids content of 47.5% by weight.

On removal of the solvent by solvent evaporation, the residue was found to be a brittle resin.

Example 4

80 grams of the aromatic petroleum residue and 80 grams of monomeric styrene were dissolved in 120 grams of xylene. The reaction mixture was heated in an autoclave under a pressure of 50 lbs. per square inch at a temperature of 205° C. The heating was continued for 3 hours, at the end of which time there was produced a product having a solids content of 53% by weight from which there was produced, by solvent evaporation, a hard, brittle resin which was insoluble in drying oils.

Example 5

A reaction mixture was produced by dissolving 40 grams of the aromatic petroleum residue and 40 grams of monomeric styrene in a solvent mixture consisting of 40 grams of xylene and 20 grams of dipentene. The reaction mixture was refluxed for 17½ hours to produce a final product having a solids contents of 53.5% by weight.

The resin produced by removal of the solvent by solvent evaporation had a melting point of 50° C. and was insoluble in drying oils; the lowering of the melting point as compared with the product of Example 1 illustrates the lower molecular complexity of the product arising from the use of the solvent and the dipentene.

Example 6

2 grams of sulphur were added to a mixture of 250 grams of the aromatic petroleum residue and 50 grams of monomeric styrene. The reaction mixture was heated under reflux for 1½ hours to produce a final product containing 94% by weight of solids; the nature of the product was that it was a viscous non-drying oil.

Example 7

30 grams of rosin were dissolved in a mixture of 180 grams of the aromatic petroleum residue and 120 grams of monomeric styrene.

The reaction mixture was heated under reflux for 6 hours at the end of which time the temperature had reached 190° C.

The reaction product contained 95% by weight of solids.

The product, on treatment with an aqueous solution of sodium hydroxide formed an emulsion from which the resinous solids could be deposited on removal of the water by evaporation.

I have found that by incorporating a higher fatty soap-forming acid in the reaction mixture or in the reaction product, I can produce products which will readily form an emulsion on mixing with an aqueous alkaline solution without the necessity of adding any emulsifying agent; if the soap-forming acid is unsaturated and is added before or during the copolymerisation reaction, then it may enter into the copolymer molecule. Such emulsifiable products are particularly suitable for the production of emulsion paints and the emulsions can be used either as coating or as impregnating compositions for a wide variety of purposes.

When the aqueous alkaline solution is ammonia or a solution of a volatile organic base then, on drying, the ammonia or the said base will be volatilised whereby the water-resistance of the deposite is enhanced as compared with that produced with the use of a non-volatile base.

What I claim is:

1. A process for the production of a copolymer which comprises heating styrene with the unsaturated aromatic extract obtained from lubricating oils treated by the Edeleanu process, the ratio by weight of styrene to extract being from about 2:1 to 1:5.

2. A process according to claim 1 wherein the copolymerisation is effected by heating under reflux.

3. A process according to claim 1 wherein the copolymerisation is effected by heating under superatmospheric pressure.

4. A process according to claim 1 wherein the copolymerisation is effected in solution in a solvent.

5. A process according to claim 4 wherein the solvent is an aromatic solvent.

6. A process according to claim 1 wherein the copolymerisation is effected in the presence of a catalytically effective amount of sulphur.

7. A process according to claim 1 wherein the copolymerisation is effected in the presence of a monocyclic alpha terpene.

8. A process according to claim 7 wherein the monocyclic alpha terpene is added to the reaction mixture during the course of the copolymerisation reaction.

9. A process according to claim 8 wherein part of the total required amount of the monocyclic alpha terpene is added to the initial reaction mixture and the remainder thereof is added during the course of the copolymerisation reaction.

10. A process according to claim 1 wherein a portion of the total required amount of styrene compound is added to the initial reaction mixture and the remainder thereof is added during the course of the copolymerisation reaction.

11. A process according to claim 1 wherein rosin is added to the initial reaction mixture and copolymerised therewith.

12. A process according to claim 1 wherein a higher fatty soap-forming acid is incorporated in the reaction mixture.

13. A new composition of matter comprising the copolymer of styrene with the unsaturated aromatic extract obtained from lubricating oils treated by the Edeleanu process, the ratio by weight of styrene to extract being from about 2:1 to 1:5.

14. A new composition of matter as claimed in claim 13 and further comprising an unsaturated higher, fatty, soap-forming acid.

15. A new composition of matter as claimed in claim 13 and further comprising rosin.

JOHN JOSEPH SLEIGHTHOLME.

REFERENCES CITED

The following references are of record in the file of this patent:

UNITED STATES PATENTS

| Number | Name | Date |
| --- | --- | --- |
| 2,092,889 | Mikeska et al. | Sept. 14, 1937 |
| 2,184,325 | Sweeney et al. | Dec. 26, 1939 |

FOREIGN PATENTS

| Number | Country | Date |
| --- | --- | --- |
| 502,730 | Great Britain | Mar. 20, 1939 |

OTHER REFERENCES

Emulsions, 7th Ed. Carbide and Carbon Chem. Co. 1946, p. 21.